(12) United States Patent
Clarke et al.

(10) Patent No.: US 11,380,317 B2
(45) Date of Patent: Jul. 5, 2022

(54) INSTRUCTION FORWARDING SYSTEM FOR A VOICE ASSISTANT

(71) Applicant: Bang & Olufsen A/S, Struer (DK)

(72) Inventors: Lyle Bruce Clarke, Lunderskov (DK); Petros Belimpasakis, Copenhagen (DK)

(73) Assignee: Bang & Olufsen A/S, Struer (DK)

( * ) Notice: Subject to any disclaimer, the term of this patent is extended or adjusted under 35 U.S.C. 154(b) by 111 days.

(21) Appl. No.: 16/618,924

(22) PCT Filed: Jan. 18, 2018

(86) PCT No.: PCT/EP2018/051173
§ 371 (c)(1),
(2) Date: Dec. 3, 2019

(87) PCT Pub. No.: WO2018/224189
PCT Pub. Date: Dec. 13, 2018

(65) Prior Publication Data
US 2021/0118438 A1      Apr. 22, 2021

(30) Foreign Application Priority Data

Jun. 9, 2017   (DK) .......................... PA 2017 00343

(51) Int. Cl.
*G10L 15/22*      (2006.01)
*G06F 3/16*       (2006.01)
*G10L 15/30*      (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS

| | | | | |
|---|---|---|---|---|
| 5,226,090 A | * | 7/1993 | Kimura | G10L 15/22 704/E15.04 |
| 8,681,949 B1 | * | 3/2014 | Witten | H04M 7/0048 379/72 |
| 9,418,658 B1 | * | 8/2016 | David | H04M 1/64 |
| 2014/0135076 A1 | * | 5/2014 | Lee | H04M 1/6041 455/569.1 |
| 2015/0061845 A1 | * | 3/2015 | Phillips | H04N 21/4755 340/384.1 |

(Continued)

OTHER PUBLICATIONS

International Search Report PCT/ISA/210 for International Application No. PCT/EP2018/051173 dated Jul. 2, 2018.

(Continued)

*Primary Examiner* — Marcus T Riley
(74) *Attorney, Agent, or Firm* — Harness, Dickey & Pierce, P.L.C.

(57) ABSTRACT

An instruction forwarding system capable of receiving an instruction such as from a user, determining a corresponding command and outputting a corresponding sound command to a Voice Assistant, which will then react to the command. The instruction may be an activation of a push button or an output from a sensor, such as a temperature sensor. Different commands may be correlated to different instructions.

10 Claims, 2 Drawing Sheets

(56) References Cited

U.S. PATENT DOCUMENTS

Figure 1:
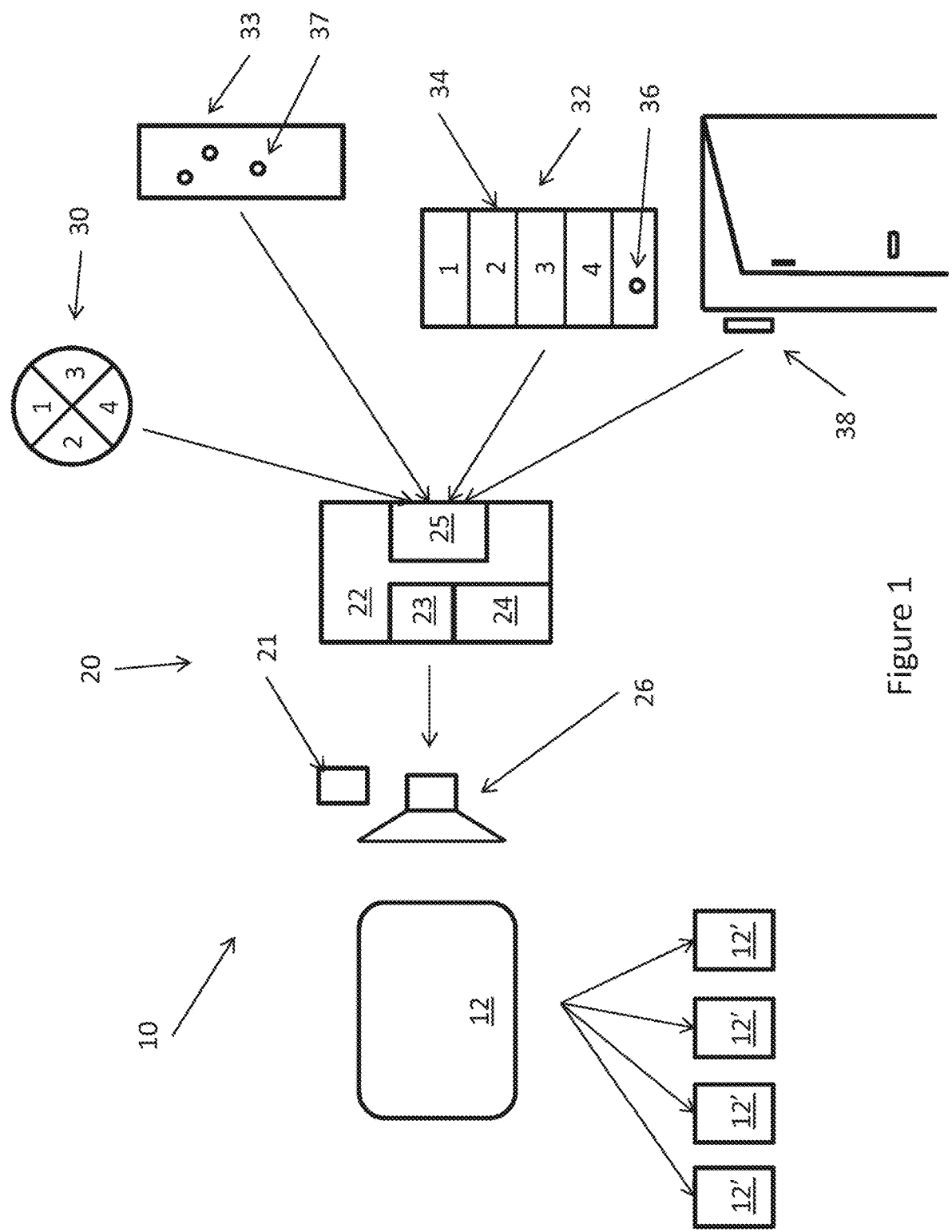

| | | | |
|---|---|---|---|
| 2016/0015004 A1* | 1/2016 | Bonge, Jr. | G06F 8/65 |
| | | | 119/718 |
| 2016/0226676 A1 | 8/2016 | Shin et al. | |
| 2016/0337497 A1* | 11/2016 | Smith | H04M 1/72412 |
| 2021/0118438 A1* | 4/2021 | Clarke | G06F 3/167 |

OTHER PUBLICATIONS

Written Opinion for International Searching Authority PCT/ISA/237 for International Application No. PCT/EP2018/051173 dated Jul. 2, 2018.

International Preliminary Report on Patentability PCT/IPEA/416 for International Application No. PCT/EP2018/051173 dated Sep. 20, 2019.

European Office Action dated Nov. 18, 2021 for corresponding European Application No. 18700909.7.

\* cited by examiner

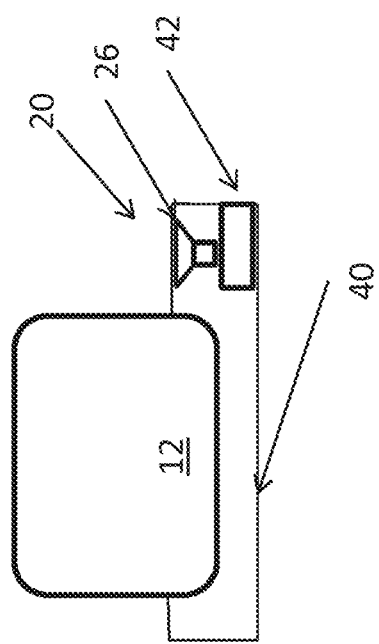

INSTRUCTION FORWARDING SYSTEM FOR A VOICE ASSISTANT

CROSS-REFERENCE TO RELATED APPLICATIONS

This application is a national phase under 35 U.S.C. § 371 of PCT International Application No. PCT/EP2018/051173 which has an International filing date of Jan. 18, 2018, which claims priority to Danish Application No. PA 2017 00343, filed Jun. 9, 2017, the entire contents of each of which are hereby incorporated by reference.

The present invention relates to a system for forwarding instructions to a Voice Assistant (VA) and in particular to a system having a plurality of pre-determined commands that may be activated remotely from the Voice Assistant without having to speak directly to the Voice Assistant.

A plethora of different Voice Assistants are becoming available to the consumers. Examples include Amazon Alexa, Microsoft Cortana, Google Voice Assistant and Apple Siri. Those Voice Assistants are implemented on different types of devices, such as mobile devices, personal computers, smart speakers (e.g. Amazon Echo, Google Home, Apple HomePod) and other consumer electronics devices. Most of those Voice Assistants are triggered via "far field voice" and a "hot word". That means that without any physical interaction, the user can freely just say: "'hot word' request" for example:

"Hey Siri, play some relaxed music" (where "Hey Siri" is the hot word)

"OK Google, play my party playlist from Spotify" (where "OK Google" is the hot word) and "Alexa, turn off all the lights" (where "Alexa" is the hot word).

These devices are constantly "listening" via their microphones, for the "hot word". And once that is detected, they pass the rest of the command to their language processing system, for analysing and performing the action that the user requested.

While using voice control with Voice Assistants is very convenient and easy to use, in some cases it might not be the most natural thing to do. For example, there might be cases where:

the user is in a social context (e.g. with friends) and it might not sound natural to "shout" among people "Hey Google, play my party playlist on Spotify", someone is sleeping in the same room and using voice control is not the best method of interaction, a person for different reasons (e.g. disability or other reasons) might not be able to speak, a person for different reasons (e.g. disability or other reasons) might not remember how to formulate the needed voice phrase, to trigger the needed action or the environment is too noisy for the Voice Assistant to distinguish/decipher the user's command/request (e.g. during a party with very loud music).

In such cases, the use of voice control is not preferred or possible. However, the functions provided by the Voice Assistants are still desired, and the user would still like to trigger them, such as via a different method than using voice/speech (e.g. a button press, a touch screen, etc.).

A first aspect of the invention relates to an instruction forwarding system comprising:

a sound output part, an instruction receiving portion configured to output a signal corresponding to an instruction received, a processing element configured to:

receive the signal and determine a corresponding command from a plurality of predetermined commands and control the sound output part to output sound corresponding to the determined command.

In the present context, an instruction may be represented in any manner and may relate to any type of instruction.

Often, commands aim at having a Voice Assistant control remotely controlled electronics, such as lights, audio systems, TVs, monitors, heating and the like. A large number of controllable elements exist which may be remotely controlled, such as via WiFi, Bluetooth, Zigbee, MBus or the like. Often, these elements are controllable using different types of controllers, such as remote controls, apps on mobile phones or the like.

Commands may be of the types fed to Voice Assistants which are voice operated controllers to which a spoken instruction may be fed and which interpret the voice instruction into a command then fed to the pertaining element, such as an audio system. Voice Assistants are today found in most mobile phones (such as Siri in iPhones) but are also provided as stand-alone elements, like Amazon Echo, Google Home, Apple HomePod, which are positioned in a room and which will react to spoken instructions, usually following a triggering or "hot" word. For the Google Home device, it will only react to instructions spoken directly after the triggering words "OK Google". The triggering word is desired, as Voice Assistants often listen constantly and thus would misunderstand instructions intended for others, such as other persons in the same room.

Examples of commands therefore may be "turn up the volume", "turn down the lights", "play Michael Jackson", "play my favourite playlist", "turn the temperature up to 20 degrees" and the like.

The system has a sound output part which normally will comprise one or more loudspeakers or other sound generating elements. The sound output part may also comprise one or more amplifiers and/or sound processing means such as e.g. DSPs and/or analogue or digital filtering means. The sound output part may be configured to output sound discernible by a Voice Assistant.

The system comprises an instruction receiving portion configured to output a signal corresponding to an instruction received. The instructions, in this context, are different from spoken commands, as the system is targeted the controlling of Voice Assistants in situations where it is not preferred to speak to the Voice Assistant. The instructions thus may be derived from user-operable elements, such as push buttons, touch pads, sensors or the like, or from sensors outputting a signal when sensing a parameter.

An instruction, thus, may simply be a signal identifying a particular desire by a user, such as an identity of a push button pressed.

In the present context, a processing element may be a single controller, processor, DSP, chip, ASIC or the like, or it may comprise a plurality of such elements configured to communicate with each other. Naturally, the processing element may have additional capabilities or functions than those described below.

The processing element is configured to receive the signal from the instruction receiving portion and determine a corresponding command from a plurality of predetermined commands.

Naturally, multiple different signals from multiple different instructions may be determined to relate to the same command. Multiple push buttons, such as positioned in different positions in a house, may all result in the same command, such as "turn off sound".

A signal corresponds to an instruction, so that the instruction may be identified from the signal. The signal may simply indicate an identity of an instruction, such as an identity of a push button pressed or a sensor sensing a parameter, such as presence of a person.

Alternatively, the signal may have contents indicating a value or quantity. This may be the situation when the instruction receiving portion receives a value from a user interaction, such as when sliding a slider, rotating a knob, shaking a phone or the like. This movement or entering may be quantified, and different quantities may result in different signals which again may result in the determination of different commands. Naturally, the quantity indicated in the signal may be compared to one or more threshold values and/or intervals, so that one command is determined if the value is below a threshold or within one interval and another command is determined if the value is above the threshold or within another interval.

Other values or parameters may be received from sensors, such as a temperature sensor, a wind sensor, a smoke detector, a rain sensor or the like. Again, thresholds and/or intervals may be defined and corresponding commands assigned.

Naturally, the signals may be transported between the instruction receiving portion and the processing element, such as via wires or wirelessly. Often, the communication is wireless, as this is the most convenient manner, such as when multiple instruction receiving portions are provided in different positions in a house.

The resulting commands may correspond to the types of commands suitable for Voice Assistants, such as "turn off the lights" or "turn off the sound". A predetermined one of the commands is determined when a signal is received. The commands suitable for a Voice Assistant also may have to do with which elements are controllable by the Voice Assistant. Thus, a set-up procedure may be carried out where an instruction is "paired" with a suitable command. This may be by entering the instruction and a corresponding command (as voice or a text, for example—or a command number of a list of commands).

Then, the pushing of a push button may result in the determination of the command, such as "turn off the sound". This push button may be positioned near a bed, so that the person listening to music while going to bed needs not get out of bed or shout to the Voice Assistant to turn off the music.

A command may be represented in any desired manner. The processing element is configured to control the sound output part to output sound corresponding to the determined command. Thus, a command may be a pre-recorded sound track or file which may be forwarded directly to the sound output part. Alternatively, the command may be a text which may be synthesized by the processing element and then fed to the sound output part as a sound track.

As mentioned, in one embodiment, the instruction receiving portion comprises a plurality of user operable elements, such as push buttons, areas on a touch screen, rotatable knobs etc., and where the instruction receiving portion is configured to output different signals when different user operable elements are operated.

Thus, from a signal, the actual user operable element may be derived. The user operable elements may be a combination of the individual types described above and may be embodied in a number of manners, such as mobile telephones, laptops, tablet computers, and remote controls. A remote control may be a more generic remote control also used for controlling other elements, such as an audio system or a TV. Other types of remote controls may be elements which may be positioned at different positions in e.g. a house and which have one or more elements, such as push buttons or touch screens and which may be operated by a user to have the commands determined and the sound output part activated.

Then, remote controls may be provided which may be e.g. attached to walls of a house, from where the system may be controlled. A remote control may be provided in a bed room, at an entrance door, in a kitchen, in a living room or the like.

Another type of instruction receiving portion is a sensor, which may be configured to output, as the instruction, a signal corresponding to a sensed parameter. Sensors may be provided for determining a number of parameters, some of which may be affected by a person while others may be affected by something else.

A sensor may be provided for sensing movement and/or the presence of a person. Thus, the parameter may be binary: is a person present or not. The parameter may alternatively be a determined distance or position of the person, so that the signal output relates to the distance or position and thus may have one of a number of values.

Other sensors may relate to surroundings of the sensor, such as precipitation, temperature, wind, or the like. Again, the sensor may output a signal relating to a quantity of the parameter sensed, such as a temperature. Alternatively, the quantity may be compared to one or more thresholds and/or intervals and may relate to whether the quantity is above or below a threshold and/or within an interval.

As mentioned, in one embodiment, the processing element comprises a storage with a plurality of pre-stored audio files, each audio file corresponding to one of the plurality of predetermined commands. Then, the processing element may be configured to:
   determine, as the command, a pre-stored audio file and
   control the sound output part by feeding the audio file to the sound output part.

In another embodiment, a storage may comprise the commands in the form of texts, words or sentences which may be converted into an audio signal by a voice synthesizer.

Naturally, the commands may be a sentence of individual words which are pre-recorded as sound, so that a sentence may be synthesized by combining the pre-recorded words of the sentence.

A second aspect of the invention relates to an assembly of a Voice Assistant and the instruction forwarding system according to the first aspect of the invention, where the sound output part is positioned in a vicinity of the Voice Assistant.

In this context, a Voice Assistant is an element comprising a microphone and which senses sound from its surroundings and de-codes this sound in search for a predetermined triggering word, sound or sentence, such as "OK Google", "Hey Siri" or "Alexa". Often, Voice Assistants "listen" constantly but act only or predominantly when hearing the triggering word or sentence.

In this situation, the commands may comprise this triggering word/sound/sentence in order to trigger the Voice Assistant.

Usually, the assembly further comprises one or more elements controllable by the Voice Assistant. Such elements may be a audio playback or audio streaming system configured to play sound and be controlled by the Voice Assistant. Other elements may be controllable lights, thermostats, TVs, blinds or curtains, windows, lights, doors, switches, or the like. Thus, the Voice Assistant may be able to control these elements remotely, such as wirelessly, such as via WiFi, Bluetooth, Zigbee, MBus or the like.

Then, entering an instruction via the instruction receiving portion will cause the processing element to determine a corresponding command and have a corresponding sound output to the Voice Assistant which will react thereto as programmed, such as to control one of the controllable elements.

In one embodiment, the system comprises an engagement means configured to maintain the Voice Assistant and the sound output part in a predetermined positional relationship. In this manner, the sound output part is positioned so that it may be heard by the Voice Assistant. This may be in the form of a cradle into which a portion of the Voice Assistant fits. Actually, the engagement means may comprise therein a power supply for both the system and the Voice Assistant so that a single power cable may ultimately power both. Also, other communication may take place between the system and Voice Assistant if desired.

In general, the present system may be adaptable by e.g. altering the instruction receiving portion to output a new signal relating to a new instruction. This may be to e.g. add a push button to the system and defining what an activation thereof should cause. Then, a corresponding command may be defined in or by the processing element, so that when the push button is activated, the new command is determined. Finally, the sound corresponding to the new command should be determined. If the commands are in the form of sound, such as when the commands are pre-recorded sound, this new sound could be added to the system. If the commands are not in the form of sound, the command is determined in a manner so that it may be converted into sound by the voice synthesizer.

In an interesting embodiment, the system further comprises a microphone configured to detect sound from surroundings of the system, the processing element being configured to control the sound output part on the basis of the sound detected. In one situation, the control of the sound output part is based also on e.g. a sound level, from the surroundings of the system, determined by this microphone. Then, if the sound level from the surroundings of the system, before outputting the sound, is high, a correspondingly loud sound may be output by the sound output part in order for the Voice Assistant to be able to understand the command. Conversely, if no or very faint sound from the surroundings of the system is detected, the sound output by the sound output part may be low in intensity, as there is no need to output a higher sound intensity. In quiet situations, it is not desired to have a noisy control system.

A third aspect of the invention relates to a method of forwarding an instruction, the method comprising:
  receiving an instruction,
  determining a command, from a plurality of predetermined commands, the determined command corresponding to the instruction received,
  controlling a sound output part to output sound corresponding to the determined command.

The instruction may be in the form of any type of signal. Usually, the instruction is received by the above instruction receiving portion which outputs a signal which is then analysed to determine the command.

In one embodiment, the step of receiving an instruction comprises detecting activation of one of a plurality of user-operable elements and outputting, as the instruction or signal, information corresponding to which user operable element is activated. As mentioned above, a user-operable element may e.g. be a push button, touch pad, or the like.

In that or another embodiment, the step of receiving an instruction comprises a sensor sensing a parameter and outputting, as the instruction, a corresponding signal.

Again, the instruction may simply be an identity of the sensor, such as if the sensor is a door sensor. Alternatively, the instruction or signal output may relate to a quantity determined by the sensor, such as if the sensor is a temperature sensor.

A quantity may be compared to one or more thresholds or intervals in order to determine whether the quantity is above or below a threshold or within an interval. Different results of this comparison may result in different instructions or signals output which again may result in the determination of different commands.

In one embodiment, the determining step comprises selecting a pre-stored audio file from a plurality of predetermined audio files, and wherein the controlling step comprises feeding the selected audio file to the sound output part. The audio files or tracks may be pre-recorded by a user or may be received from a central server, such as during set-up or production of the system.

Alternatively, the audio signal fed to the sound output part may be created by a voice synthesizer receiving a text or the like to be synthesized into an audio signal.

Preferably, the outputting step comprises outputting the sound to a Voice Assistant which preferably then remotely controls one or more controllable elements as a result of the sound received by the Voice Assistant.

As mentioned above the method may comprise the step of detecting sound, where the controlling step comprises controlling the sound output part based on the sound detected. This detection may be a determination of a sound level, such as at the Voice Assistant, before outputting the sound. Then, the sound output level may be correlated with the sound level, so that the higher the sound level, the higher an intensity the output sound has.

Another aspect of the invention relates to a method of operating a Voice Assistant, the method comprising:
  receiving an instruction,
  from the instruction, generating an audio signal,
  feeding the audio signal to a signal path in the Voice Assistant between a microphone and a processor of the Voice Assistant.

A similar aspect relates to an assembly of a Voice Assistant and an instruction forwarding system comprising:
  an instruction receiving portion configured to output a signal corresponding to an instruction received,
  a processing element configured to:
    receive the signal and determine a corresponding command from a plurality of predetermined commands and
    output, to a signal path between a microphone and a processor of the Voice Assistant, an audio signal corresponding to the determined command.

In these embodiments, an audio signal is fed directly to a signal path between a microphone and a processor of the Voice Assistant. In this situation, the microphone of the Voice Assistant may be disabled to not interfere with instructions received from the processing element. Alternatively, the microphone may be active so that also voice commands may be fed to the Voice Assistant. This audio signal preferably corresponds to the audio signals described above, so that the present method and assembly emulates the signal in the signal path which would have been generated by the microphone if the corresponding sound was received by the microphone.

In this manner, the assembly and method could be used also in very noisy environments where it would otherwise be difficult to output sound discernible by the Voice Assistant or in very quiet situations where it is not desired to have to output sound to the Voice Assistant to control it.

In the following, preferred embodiments are described with reference to the drawings, wherein:

FIG. 1 illustrates an assembly of a Voice Assistant and an instruction forwarding system according to the invention, FIG. 2 illustrates an assembly of a Voice Assistant provided in a cradle comprising also a sound output part.

In FIG. 1, an overall assembly 10 is seen with a Voice Assistant 12 and an instruction forwarding system 20 for instructing the Voice Assistant 12.

The Voice Assistant 12 usually is connected to a number of electronic elements in e.g. a house, such as an audio system, a TV, lights, heating and the like (illustrated by boxes 12'). The Voice Assistant 12 is operated by voice or audio and may thus control the audio system, TV, lights, heating and the like based on the voice commands received.

The system 20 comprises a sound output part 26 positioned so close to the Voice Assistant 12 that the Voice Assistant 12 may receive sound output by the sound output part 26. The sound output part 26 is controlled by a processing element 22 having a storage 24.

The processing element 22 receives instructions from a receiver 25 which may receive instructions from different instruction elements, such as:
- a remote control 33 comprising a number of individual push buttons 37,
- a touch panel 30 comprising a number of individual push buttons 1, 2, 3, or 4,
- a rotatable knob (not illustrated) rotatable by a person,
- a touch pad 32 having individual portions 34 which may be activated or a slider 36 which may be activated, or
- a sensor configured to determine a parameter which may be affected by a person.

User operable sensors may be proximity sensors, movement sensors, door sensors 38, accelerometers, or the like.

Sensors may also be used which are not directly operated or activated by users, such as light sensors, temperature sensors, rain sensors, humidity sensors, or the like.

In general, the user operable elements will output information as to an element operated (such as a push button pushed), a parameter sensed (door open, slider moved 10% to the right, or a proximity sensor is activated), or the like.

Thus, the information or instruction output may simply relate to the activation or identity, or to a parameter of the activation.

Also, the information or instructions from other sensors, such as temperature sensors, may relate to a parameter (e.g. temperature) sensed or merely that a parameter is sensed.

The user operable elements 30-38 and the receiver 25 thus form an instruction receiving portion generally receiving the instruction from the push button, sensor or the like and feeding a corresponding signal to the processing element 22.

The information, signals or instructions are fed to the processing element 22. This communication may be wired or wireless. The communication may simply be one-way, or a two-way communication may be used whereby an indication is fed back to the element that the instruction has been received. An indication of this type may be used for indicating to the user that the instruction is received, such as by vibrating or outputting sound/light from the user operable element or by displaying a message on a display of a user operable element.

The processing element 22 is configured to analyse the information or instruction received and to determine a corresponding command, which typically is an audio track or file stored in the storage 24. This determined command, audio track or file is fed (arrow) to the sound output part 26 which outputs corresponding sound to the Voice Assistant 12 which is thereby controlled by the sound track and ultimately based on the instruction element operated.

Alternatively, the audio may be produced by a synthesizing element 23 which may be fed with a sentence or other information which is then converted into a command in the form of an audio signal and fed to the sound output part 26.

Then, the processing element 22 may be configured to correlate an instruction or signal received (arrow), by the receiver 25, with a particular audio track or file, stored in the storage 24. A push button may thus cause the processing element 22 to select an audio track or file which, when output as sound by the sound output part 26 and received by the Voice Assistant 12, may make the Voice Assistant 12 stop playing music.

The translation of a slider 36 (either on a touch pad, embodied as a rotating knob or the like) may cause the processing element 22 to have the sound output part 26 output a command making the Voice Assistant 12 turn up the volume of music provided by an audio system.

An activation of a door sensor 38 may cause the processing element 22 to select an audio track or file causing the Voice Assistant 12 to start playing music, such as a particular track, or turn on/off lights. An activation of a window sensor may cause the Voice Assistant 12 to turn off heating in that room.

A rain sensor sensing that it has started to rain may make the processing element 22 select an audio track or file causing the Voice Assistant 12 to select a particular music track or a particular play list.

A temperature sensor may output information relating to a temperature sensed. The processing element 22 may monitor this temperature and, when the temperature exceeds or falls below a particular threshold temperature, may select an audio track or file causing the Voice Assistant 12 to turn on/off heating or set a heating temperature.

Thus, for each user operable element and/or sensor, one or more commands may be defined determining what audio track or file is to be output to the Voice Assistant 12. Usually, a single command is defined for user operable elements having a binary output pattern (operated or not), whereas a number of commands may be defined for different parameters or parameter intervals, if the user operable element or sensor is capable of outputting e.g. a value within a particular interval, where this interval may then be sub-divided into smaller intervals each corresponding to a command.

Thus, if a slider is moved to the value of 22% (of max value), this value may be compared to a threshold of 20% and thus be found above the threshold. This may result in the determination of one command. A comparison to a threshold of 30% would find the value below the threshold and thereby in the determination of another command. The comparison could be to different intervals, such as 0-10%, 10-20%, 20-30% . . . 90-100%, whereby the determination that the value is in the interval of 20-30% could result in a determination of a corresponding command. Also, the value being 22% could result in a corresponding command to be selected.

The processing element 22 thus may receive the instructions from one or more elements and determine which command(s) to output to the Voice Assistant 12.

It is noted that combinations of situations or instructions may also be seen. Thus, if the door sensor 38 is operated while the temperature is above a threshold temperature, the Voice Assistant 12 may not be instructed to turn on the lights, whereas if the door sensor 38 is operated and the temperature is below the threshold, the Voice Assistant 12 may be instructed to turn on the lights.

The audio files or tracks of the storage 24 may be pre-recorded commands. Alternatively, the processing element 22 may comprise sound synthesizing capabilities 23, so that the commands may be stored as text, codes or the like which may then be converted into an audio signal by the synthesizer 23. Irrespective of this, the processing element 22 generates an audio signal which when output by the sound output part 26 is a voice-like instruction which the Voice Assistant 12 will understand.

Naturally, user-operable elements may be replaced or new ones added. Then, the processing element 22 may be configured to add such an element, i.e. to set up communication there with, as well as the commands which are to be carried out when the new element is activated.

Usually, Voice Assistants 12 are configured to react only to sound commands initiated with a "hot word", such as "OK Google". Thus, the processing element 22 may be configured to add such a "pre-amble" to the audio track or file sent to the sound output part 26. As different "hot words" are used by different Voice Assistants, the processing element 22 may be pre-programmed to the particular Voice Assistant 12 in order to output the correct "hot word".

In one embodiment, the system further comprises a microphone 21 positioned in the vicinity of the Voice Assistant 12 or the sound output part 26. The processing element 22 may then determine a noise or sound level at the Voice Assistant 12 before outputting sound signals to the sound output part 26. Then, the sound intensity of the sound from the sound output part 26 may be adapted to the general sound level at the Voice Assistant 12, so that the Voice Assistant 12 will be able to always discern the sound from the sound output part 26 and so that sound is not output with a higher intensity than required.

In FIG. 2, a cradle 40 is provided in which the Voice Assistant 12 and the instruction forwarding system 20 are positioned. Then, the sound output part 26 may have a well-defined position in relation to the Voice Assistant 12 and in particular a microphone thereof. Then, the cradle 40 may have a design adapted to that of the Voice Assistant 12. In addition, the cradle 40 may comprise an element 42 which may comprise the processing element 22 and/or a power plug or power supply for the Voice Assistant 12 and optionally also for the processing element 22, so that a single power cable may be required from the assembly to a power outlet.

The invention claimed is:

1. An assembly of a voice assistant and an instruction forwarding system, where a sound output part is positioned in a vicinity of the voice assistant, the instruction forwarding system comprising:
   the sound output part,
   an instruction receiving portion comprising a plurality of user operable elements, the instruction receiving portion is configured to output a signal when a user operable element is operated and where the instruction receiving portion is configured to output different signals when different user operable elements are operated, each signal corresponding to an instruction received, and
   a processing element configured to:
      receive the signal from the instruction receiving portion,
      determine, based on processing the signal, a corresponding command of a plurality of predetermined commands, wherein the corresponding command is associated with the signal and is a command to the voice assistant to control one or more controllable elements to perform at least one operation, one or more commands being defined for each user operable element, and
      control the sound output part to output a sound corresponding to the corresponding command to cause the voice assistant to, in response to receiving the sound, control the one or more controllable elements to perform the at least one operation,
   wherein
      the corresponding command is a pre-recorded audio file associated with the signal and with the sound, and the sound output part is controlled based on feeding the pre-recorded audio file to the sound output part to cause the sound output part to output the sound, or
      the corresponding command is text associated with the signal and with the sound, and the sound output part is controlled based on processing the text to synthesize a sound track and feeding the sound track to the sound output part to cause the sound output part to output the sound.

2. An assembly according to claim 1, wherein the instruction receiving portion comprises one or more sensors each configured to output, as the instruction, a signal corresponding to a sensed parameter.

3. An assembly according to claim 1, further comprising a microphone configured to detect sound from surroundings of the instruction forwarding system, the processing element being configured to control the sound output part on a basis of the sound detected.

4. An assembly according to claim 1, wherein the instruction forwarding system comprises an engagement means configured to maintain the voice assistant and the sound output part in a predetermined positional relationship.

5. An assembly according to claim 1, wherein one command is defined for each user operable element.

6. A method of forwarding an instruction to a voice assistant, the method comprising:
   an instruction receiving portion, comprising a plurality of user operable elements, outputting a signal when a user operable element is operated, the instruction receiving portion outputting different signals when different user operable elements are operated,
   receiving, by a processing element, the signal from the instruction receiving portion,
   determining, based on processing the signal, a corresponding command, from a plurality of predetermined commands, wherein the corresponding command is associated with the signal and is a command to the voice assistant to control one or more controllable elements to perform at least one operation, one or more commands being defined for each user operable element, and
   controlling a sound output part to output a sound corresponding to the corresponding command to cause the voice assistant to, in response to receiving the sound, control the one or more controllable elements to perform the at least one operation, wherein the corresponding command is a pre-recorded audio file associated with the signal and with the sound, and the sound output part is controlled based on feeding the pre-recorded audio file to the sound output part to cause the sound output part to output the sound, or the corresponding command is text associated with the signal and with the sound, and the sound output part is controlled based on processing the text to synthesize a sound track and feeding the sound track to the sound output part to cause the sound output part to output the particular sound.

7. A method according to claim 6, further comprising a step of receiving the instruction, the instruction receiving step comprising detecting activation of one of a plurality of user-operable elements and outputting, as the instruction, information corresponding to which user operable element is activated.

8. A method according to claim 6, further comprising a step of receiving the instruction, the instruction receiving step comprising sensing by a sensor a parameter and outputting, as the instruction, a corresponding signal.

9. A method according to claim 6, further comprising a step of detecting sound, where the controlling the sound output part comprises controlling the sound output part based on the sound detected.

10. A method according to claim 6, wherein one command is defined for each user operable element.

* * * * *